(12) United States Patent
Huang et al.

(10) Patent No.: US 11,081,304 B2
(45) Date of Patent: Aug. 3, 2021

(54) LOAD CONTROL SYSTEM AND CONTROL METHOD THEREOF

(71) Applicant: GRAND MATE CO., LTD., Taichung (TW)

(72) Inventors: Chung-Chin Huang, Taichung (TW); Chin-Ying Huang, Taichung (TW); Hsin-Ming Huang, Taichung (TW); Hsing-Hsiung Huang, Taichung (TW); Yen-Jen Yeh, Taichung (TW); Chia-Yu Wang, Taichung (TW)

(73) Assignee: GRAND MATE CO., LTD., Taichung (TW)

( * ) Notice: Subject to any disclaimer, the term of this patent is extended or adjusted under 35 U.S.C. 154(b) by 262 days.

(21) Appl. No.: 15/910,369

(22) Filed: Mar. 2, 2018

(65) Prior Publication Data

US 2019/0272965 A1 Sep. 5, 2019

(51) Int. Cl.
*H01H 47/02* (2006.01)
*H02J 7/00* (2006.01)
(Continued)

(52) U.S. Cl.
CPC .......... *H01H 47/02* (2013.01); *H02J 7/0063* (2013.01); *H02J 7/34* (2013.01); *G05D 23/19* (2013.01)

(58) Field of Classification Search
CPC .......... H01H 47/02; H02J 7/0063; H02J 7/34; H02J 7/345; H02J 7/007184; G05D 23/19; G05D 23/1393; B60L 58/20; B60L 1/003; B60L 1/02; B60L 2210/10; B60L 2210/12; B60L 2210/14; B60L 2240/34; B60L 2240/527; B60L 2260/26; B60L 2270/142;
(Continued)

(56) References Cited

U.S. PATENT DOCUMENTS 5,373,910 A 12/1994 Nixon
2003/0110337 A1 6/2003 Verdun et al.
(Continued)

FOREIGN PATENT DOCUMENTS

WO 2011055217 A2 5/2011

OTHER PUBLICATIONS

European Search Report for EP18160162, dated Apr. 9, 2018, Total of 8 pages.

*Primary Examiner* — Rexford N Barnie
*Assistant Examiner* — Elim Ortiz
(74) *Attorney, Agent, or Firm* — Tracy M. Heims; Apex Juris, Pllc.

(57) ABSTRACT

A load control system includes a power switching device and a control device, wherein the power switching device includes a first power input port, a second power input port and a power output port. The first power input port and the second power input port are electrically connected to a first battery and a second battery respectively, and the power output port is electrically connected to the control device. The power output port receives the power which is input to the first power input port or the second power input port so as to supply the power to the control device. The control device is adapted to control a load to switch and to control the power switching device to utilize the power from the first power input port and the second power input port alternatively, thereby extending the respective usage time of the first battery and the second battery.

5 Claims, 8 Drawing Sheets

(51) Int. Cl.
*H02J 7/34* (2006.01)
*G05D 23/19* (2006.01)

(58) Field of Classification Search
CPC ........... B60L 2270/147; Y02T 10/7066; Y02T 10/642; Y02T 10/7216; Y02T 10/7225; Y02T 10/7233; Y02T 10/7005; H03K 17/567; H02M 1/36; H02M 2001/322
See application file for complete search history.

(56) References Cited

U.S. PATENT DOCUMENTS

| | | | |
|---|---|---|---|
| 2003/0117019 A1* | 6/2003 | Furukawa | B60L 58/20 307/10.6 |
| 2011/0027626 A1 | 2/2011 | Lattin | |
| 2011/0127935 A1* | 6/2011 | Gao | H02M 1/36 318/400.3 |
| 2012/0091731 A1* | 4/2012 | Nelson | B60L 58/22 290/1 R |
| 2012/0131367 A1* | 5/2012 | Kamijima | G06F 1/3212 713/323 |
| 2012/0248869 A1* | 10/2012 | Itagaki | H02J 7/1461 307/9.1 |
| 2018/0226905 A1* | 8/2018 | Botts | H01M 10/482 |

* cited by examiner

LOAD CONTROL SYSTEM AND CONTROL METHOD THEREOF

BACKGROUND OF THE INVENTION

1. Technical Field

The present invention is related to a control system, and more particularly related to a load control system and a control method thereof.

2. Description of Related Art

A load controller is adapted to control a load to switch on and off. Referring to FIG. 1, the load L is illustrated by an air conditioning system as an example, wherein the load L includes a switch 10 and a brake 20. When the switch 10 is triggered to be short-circuited, the brake 20 would operate to change room temperature; when the switch 10 is open-circuited, the brake 20 stops operating. The load controller 1 is usually connected to a battery pack 301 which is formed by a plurality of series-connected batteries and supplies the power to the load controller 1 for operating. The load controller 1 is adapted to control the switch 10 to be short-circuited or open-circuited so as to enable the brake 20 to operate or stop operating.

Since the load controller 1 is usually connected to only one battery pack 301 which has limited power, the electric quantity of the battery pack 301 would be run out by the load controller 1 after operation for a period of time, resulting in the inconvenience that a user needs to replace the battery frequently.

To increase the operating time of the load controller 1, some manufacturers in the industry would connect another battery pack 302 with the battery pack 301 in parallel to increase electric quantity (as shown in FIG. 2), thereby reducing the replacement frequency of the batteries.

Although the aforementioned parallel connected battery packs 301, 302 could increase electric quantity, however, when the voltages of the battery packs 301, 302 are not balanced with each other, the battery pack 301 or 302 which has a higher voltage would not only supply power to the load controller 1 but also recharge the other one of the battery pack 301 and 302 which has a lower voltage as well, resulting in unnecessary power consumption. In addition to unnecessary power consumption, the unbalanced voltage would also shorten the lifetime and decrease the efficiency of the battery packs 301, 302 easily, and even damage the battery packs 301, 302, thereby running out the electric quantity of the battery packs 301, 302 earlier.

BRIEF SUMMARY OF THE INVENTION

In view of the above, the present invention is to provide a load control system and a control method thereof so as to reduce the replacement frequency of the batteries.

To achieve the object mentioned above, the present invention provides a load control system. The load control system is adapted to be connected to at least one first battery and at least one second battery and to control a load to switch between a first state and a second state. The load control system includes a power switching device and a control device, wherein the power switching device includes a first power input port, a second power input port and a power output port. The first power input port is electrically connected to the first battery and the second power input port is electrically connected to the second battery. The power switching device operates in one of a first switching mode and a second switching mode, and is controllable to operate in another one of the first switching mode and the second switching mode, wherein the first power input port and the power output port are in conduction with each other in the first switching mode, and the second power input port and the power output port are in conduction with each other in the second switching mode. The control device is electrically connected to the power output port to receive the power supplied from the power output port to operate; when the control device operates to receive a control signal, the control device would control the load to switch from one of the first state and the second state to another one of the first state and the second state according to the received control signal, and control the power switching device to switch from one of the first switching mode and the second switching mode to another one of the first switching mode and the second switching mode.

The control method for the load control system according to the present invention includes the steps of A. making the power switching device operate in the first switching mode to supply power from at least one first battery to the control device, thereby enabling the control device to operate; B. transmitting the control signal to the control device to control the load to switch from the first state to the second state with the control device according to the received control signal, and controlling the power switching device to operate in the second switching mode with the control device to supply power from at least one second battery to the control device.

The advantage of the present invention is that the control device could utilize the power of the first battery and the second battery respectively, thereby extending the respective usage time of the first battery and the second battery, and reducing the replacement frequency of the batteries as well.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
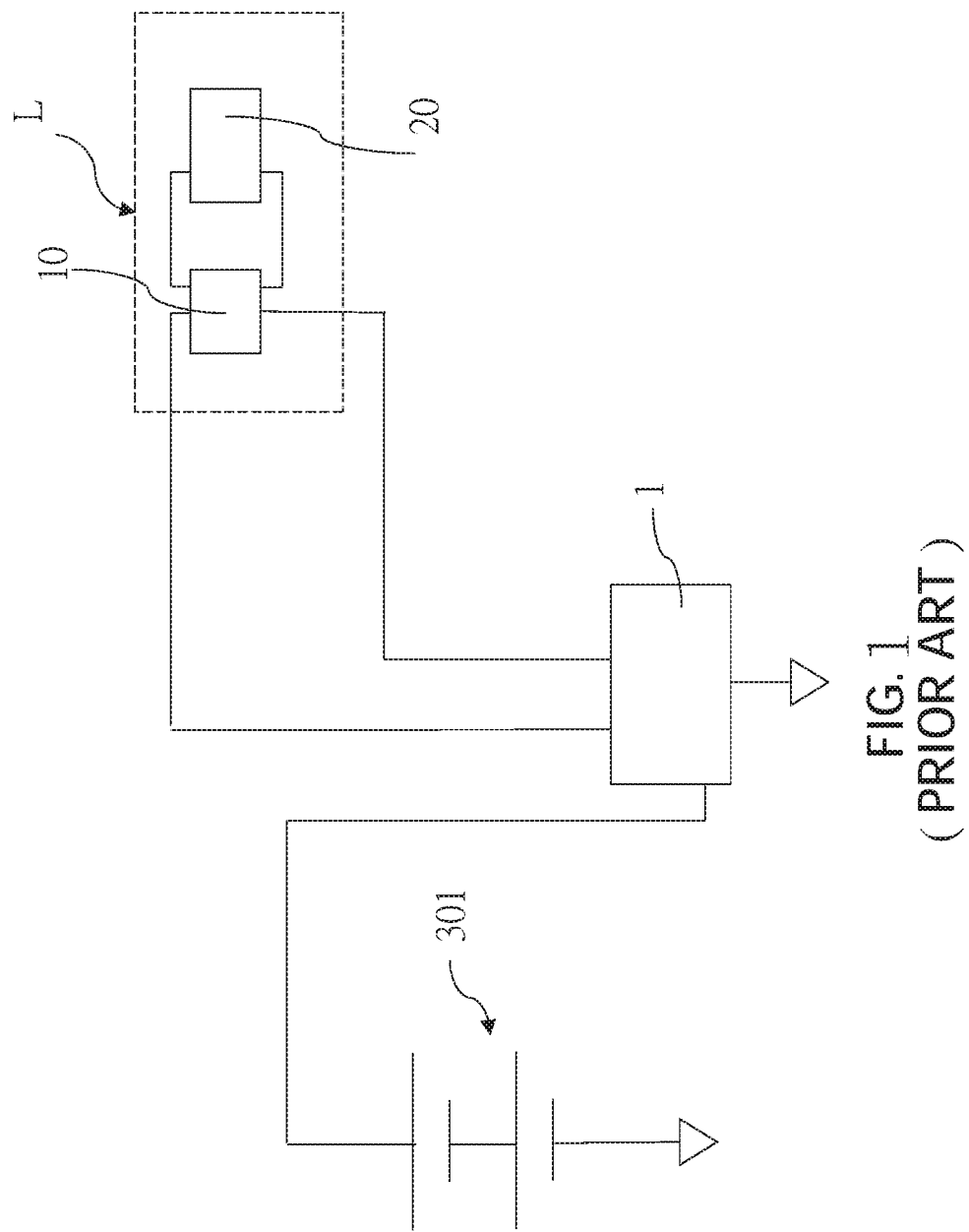
FIG. 1 is a schematic view showing a connection configuration of a conventional load controller.
Figure 2:
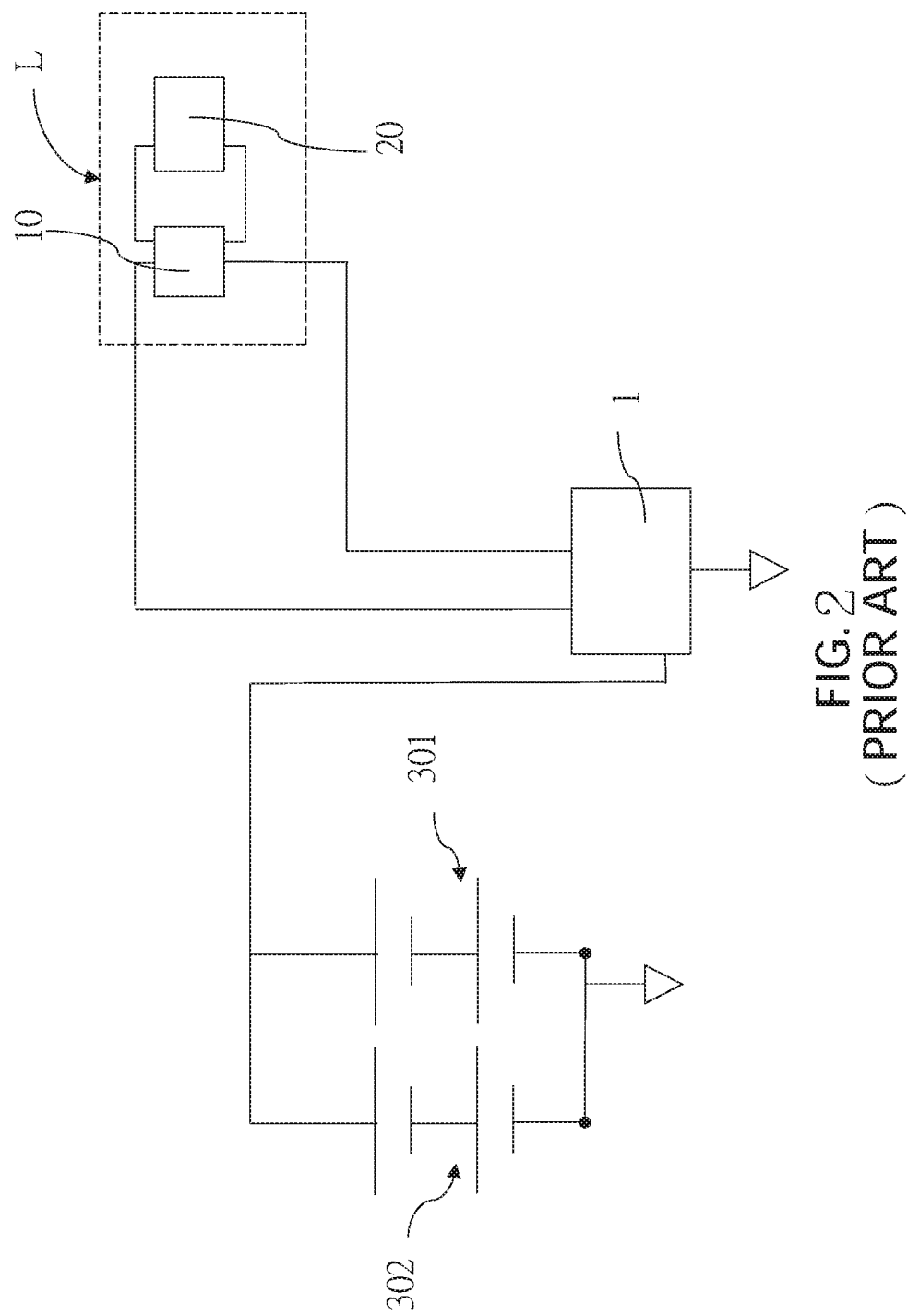
FIG. 2 is a schematic view showing a connection configuration of another conventional load controller.
Figure 3:
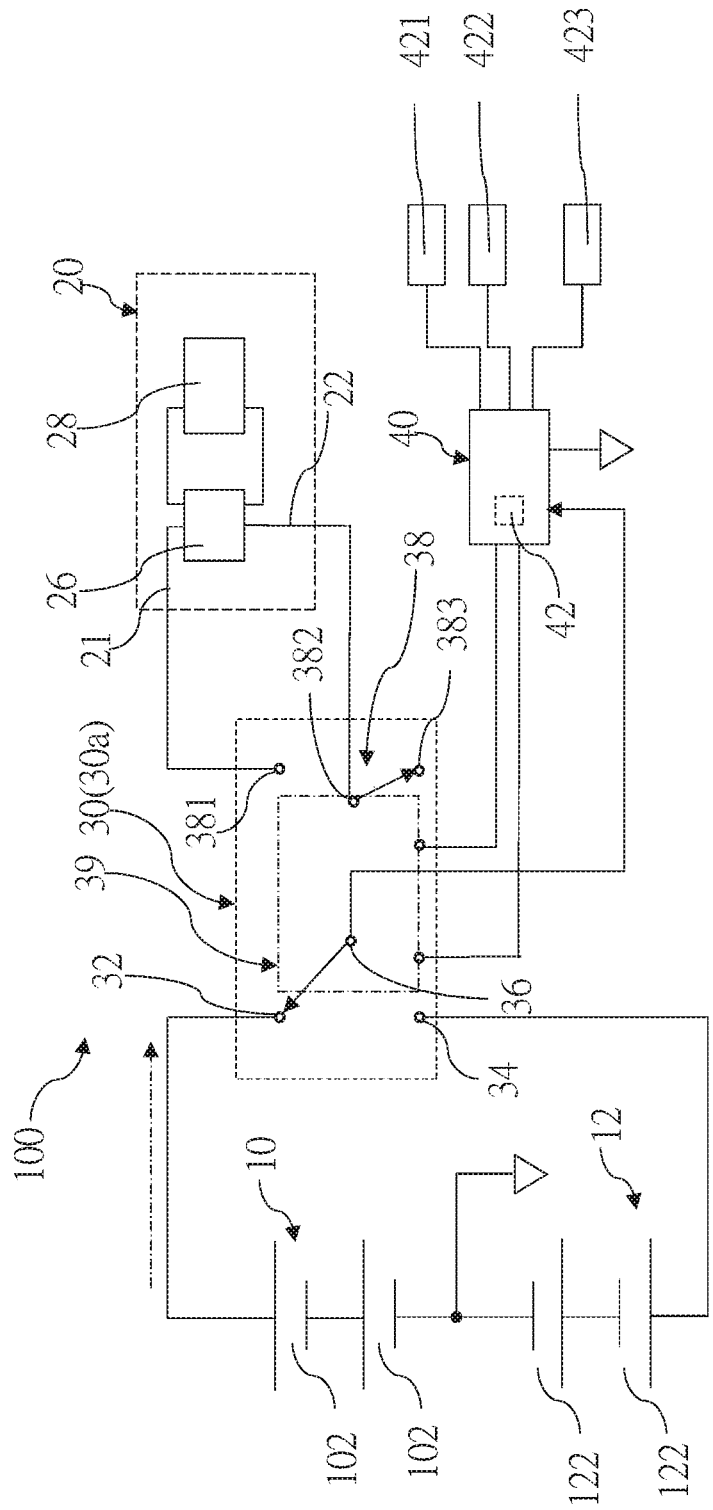
FIG. 3 is a schematic view showing a connection configuration of a load control system of a first embodiment according to the present invention.
Figure 4:
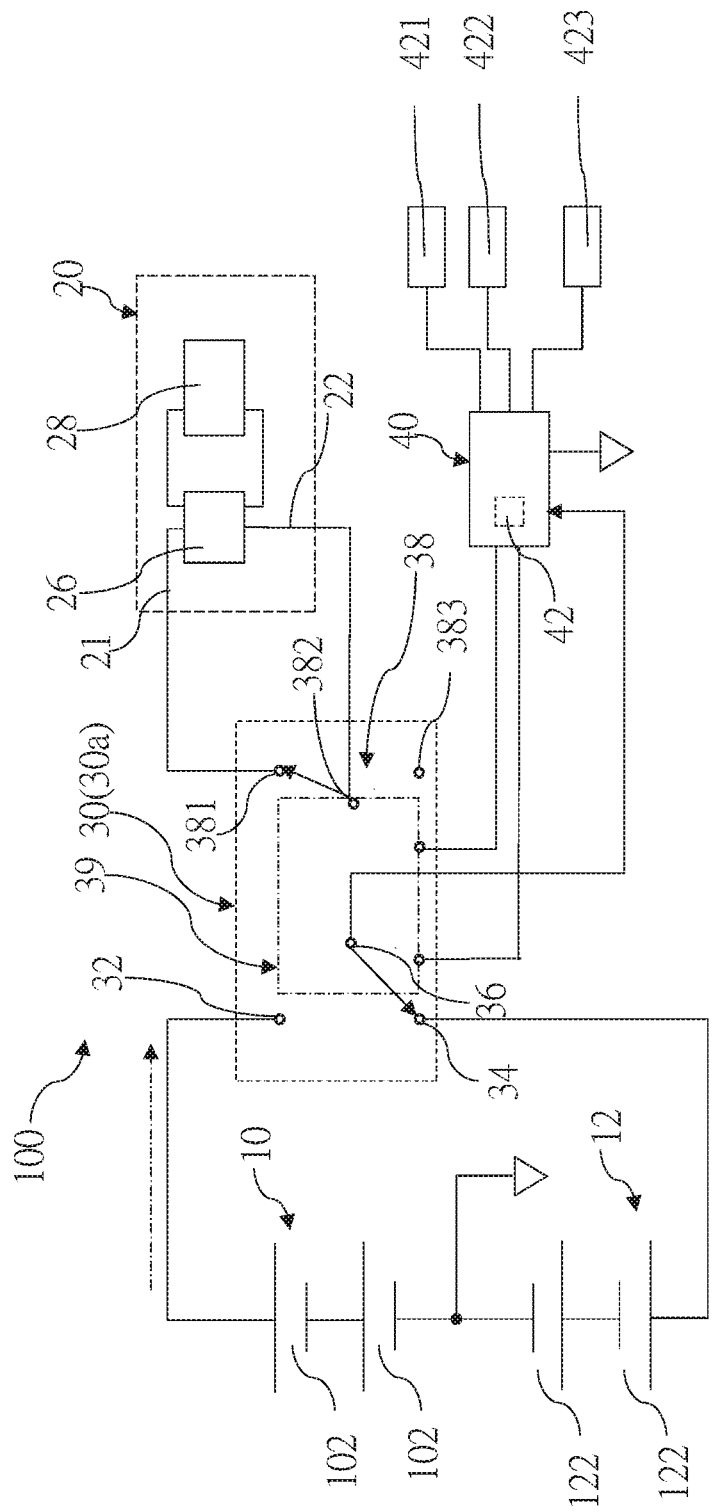
FIG. 4 is a schematic view showing that the power switching device of the first embodiment operates in a second switching mode.

The following illustrative embodiments and drawings are provided to illustrate the disclosure of the present invention, these and other advantages and effects can be clearly understood by persons skilled in the art after reading the disclosure of this specification. As shown in FIG. 3 and FIG. 4, a load control system 100 of a first embodiment according to the present invention is adapted to be connected to a first battery pack 10 and a second battery pack 12 and to control a load 20 to switch between a first state and a second state. In this embodiment, the first battery pack 10 includes a plurality of series-connected first batteries 102, and the second battery pack 12 includes a plurality of series-connected second batteries 122; in practice, the first battery pack 10 could include at least one first battery 102, and the second battery pack 12 could include at least one second battery 122. In this embodiment, the load 20 operates with an independent power supply, and does not receive power from the first battery pack 10, the second battery pack 12 or the load control system 100; the first state of the load 20 is defined as an idle state as an example, and the second state of the load 20 is defined as an operation state as an example. In practice, the first state could also be defined as the operation state, and the second state could also be defined as the idle state.

The load 20 includes two connecting wires 21, 22 and is in the first state when the two connecting wires 21, 22 are open-circuited, and in the second state when the two connecting wires 21, 22 are short-circuited. In this embodiment, the load 20 is illustrated by an air conditioning system as an example, wherein the load 20 includes a switch 26 and a brake 28. The switch 26 is connected to the two connecting wires 21, 22. When the two connecting wires 21, 22 are open-circuited, the brake 28 stops operating (that is, the load 20 is in the first state); when the two connecting wires 21, 22 are short-circuited, the brake 28 would operate (that is, the load 20 is in the second state) to change room temperature.

The load control system 100 includes a power switching device 30 and a control device 40, wherein the power switching device 30 includes a first power input port 32, a second power input port 34 and a power output port 36. In this embodiment, the power switching device 30 includes a relay 30a comprising three contacts which form the first power input port 32, the second power input port 34 and the power output port 36 respectively. In addition, the relay 30a further includes a control port 38 which includes a first contact 381, a second contact 382 and a third contact 383. The relay 30a includes a switching unit 39 which is controllable to enable the first power input port 32 and the power output port 36 to be in conduction with each other, the second power input port 34 and the power output port 36 to be open-circuited, the first contact 381 and the second contact 382 of the control port 38 to be open-circuited, and the second contact 382 and the third contact 383 to be short-circuited, which defines the power switching device 30 as being operated in a first switching mode (as shown in FIG. 3). The switching unit 39 is controllable to enable the second power input port 34 and the power output port 36 to be in conduction with each other, the first power input port 32 and the power output port 36 to be open-circuited, the first contact 381 and the second contact 382 of the control port 38 to be short-circuited, and the second contact 382 and the third contact 383 to be open-circuited, which defines the power switching device 30 as being operated in a second switching mode (as shown in FIG. 4). The power switching device 30 only operates in the first switching mode or in the second switching mode.

The first power input port 32 is electrically connected to one terminal (e.g., positive electrode) of the first battery pack 10; the second power input port 34 is electrically connected to one terminal (e.g., positive electrode) of the second battery pack 12, and the other terminals (e.g., negative electrodes) of the first battery pack 10 and the second battery pack 12 are electrically connected to each other. In this embodiment, only the first contact 381 and the second contact 382 of the control port 38 are utilized and the first contact 381 and the second contact 382 are electrically connected to the two connecting wires 21, 22 of the load 20 respectively. In practice, the second contact 382 and the third contact 383 also could be utilized to be electrically connected to the two connecting wires 21, 22 respectively.

The control device 40 includes a power input port, wherein a positive terminal of the power input port is electrically connected to the power output port 36, and a negative terminal of the power input port is electrically connected to another terminal (negative electrode) of the first battery pack 10 and the second battery pack 12 so as to receive the power supplied from the power output port 36 to operate; the power supplied from the power output port 36 is not supplied to the load 20. The control device 40 is electrically connected to the switching unit 39 to control the switching unit 39 to switch. The control device 40 includes a power detection module 42 to detect the power supplied from the power output port 36, for example, through detecting the voltage and/or the current. The power detection module 42 could include an analog-to-digital converter. The control device 40 is connected to a display unit 421, a thermometer 422 and a control interface 423, wherein the display unit 421 is adapted to display state information, i.e., the operation state (power on/off), the power state of the first battery pack 10 or the second battery pack 12, the temperature detected by the thermometer 422; the control interface 423 is adapted to be operated by a user to generate a control signal for the control device 40. In practice, the control device 40 could also transmit the state information to mobile devices via wireless transmission or receive the control signal from the mobile devices.

Figure 5:
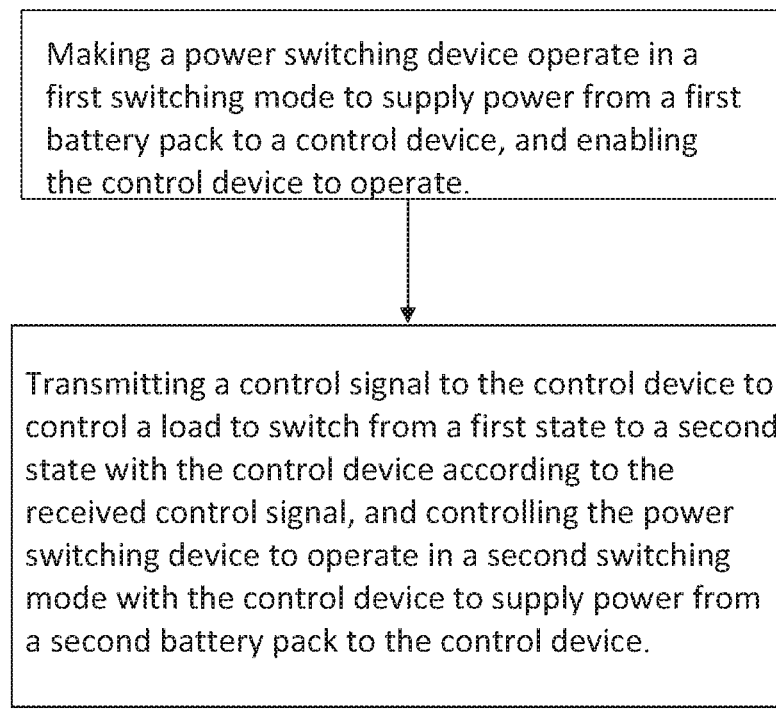
FIG. 5 is a flowchart of a control method of the first embodiment.

With the aforementioned configuration, a control method for the load control system of the first embodiment of the present invention would be described, wherein the method includes the following steps, as shown in FIG. 5.

First, making the power switching device 30 operate in the first switching mode to supply power from the first battery pack 10 to the control device 40, thereby enabling the control device 40 to operate. The first contact 381 and the second contact 382 of the control port 38 are open-circuited and the load 20 is in the first state (i.e., stop operating).

Then, transmitting the control signal to the control device 40 to control the load 20 to switch from the first state to the second state with the control device 40 according to the received control signal and controlling the power switching device 30 to operate in the second switching mode with the control device 40 to supply power from the second battery pack 12 to the control device 40. In this embodiment, the control interface 423 is operated by the user to transmit the control signal to the control device 40, and the control device 40 would control the switching unit 39 of the relay 30a to switch according to the received control signal so as to control the power switching device 30 to operate in the second switching mode, thereby controlling the load 20 to switch from the first state to the second state (i.e., in operation) and supply power from the second battery pack 12 to the control device 40.

With the aforementioned control method, the control device 40 could utilize the power from the first battery pack 10 and the second battery pack 12 respectively, thereby extending the respective usage time of the first battery pack 10 and the second battery pack 12, and reducing the replacement frequency of the batteries. Unnecessary loss due to the parallel-connected first battery pack 10 and second battery pack 12 could be avoided as well.

In practice, after the aforementioned steps, the control method could further include steps of transmitting the control signal to the control device 40 to control the load 20 to switch from the second state to the first state with the control device 40 according to the received control signal, and controlling the power switching device 30 to operate in the first switching mode to supply power from the first battery pack 10 to the control device 40. In this embodiment, the control interface 423 is operated by the user to transmit the control signal to the control device 40, and the control device 40 would control the switching unit 39 of the relay 30a to switch according to the received control signal so as to control the power switching device 30 to operate in the first switching mode, thereby controlling the load 20 to switch from the second state to the first state (i.e., stop operating) and supply power from the first battery pack 10 to the control device 40. Whereby, when the user controls the load 20 to switch between the first state and the second state, the power of the first battery pack 10 and the second battery pack 12 could be utilized alternatively.

Figure 6:
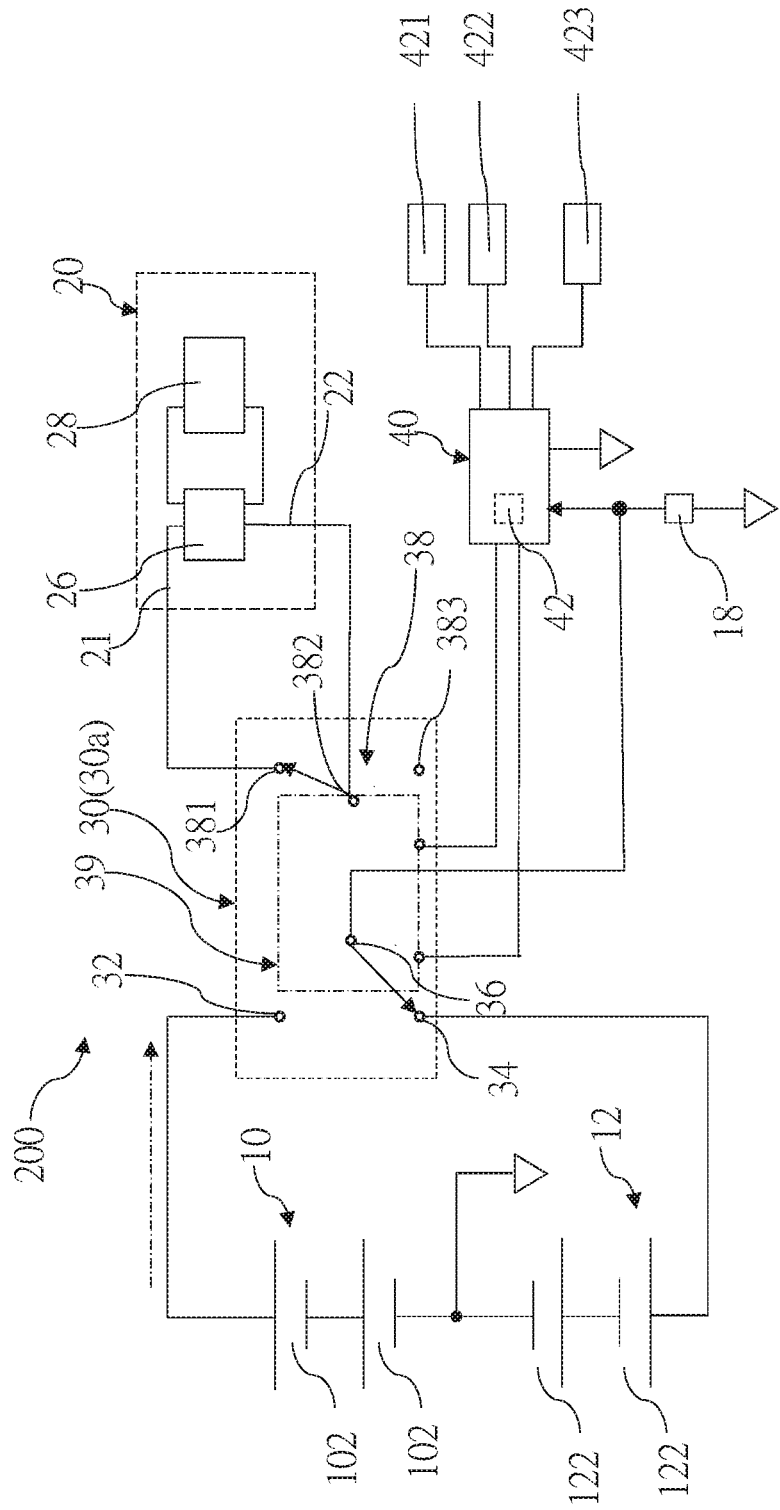
FIG. 6 is a schematic view showing a connection configuration of a load control system of a second embodiment according to the present invention.

As shown in FIG. 6, a load control system 200 of a second embodiment according to the present invention includes a similar configuration based on the system of the first embodiment but further includes a power storage unit 18, wherein the power storage unit 18 is electrically connected to the power input port of the control device 40 and the power output port 36. In this embodiment, the power storage unit 18 is a capacitor as an example; in practice, rechargeable batteries and other elements which have power storage function could be utilized as well.

Figure 7:
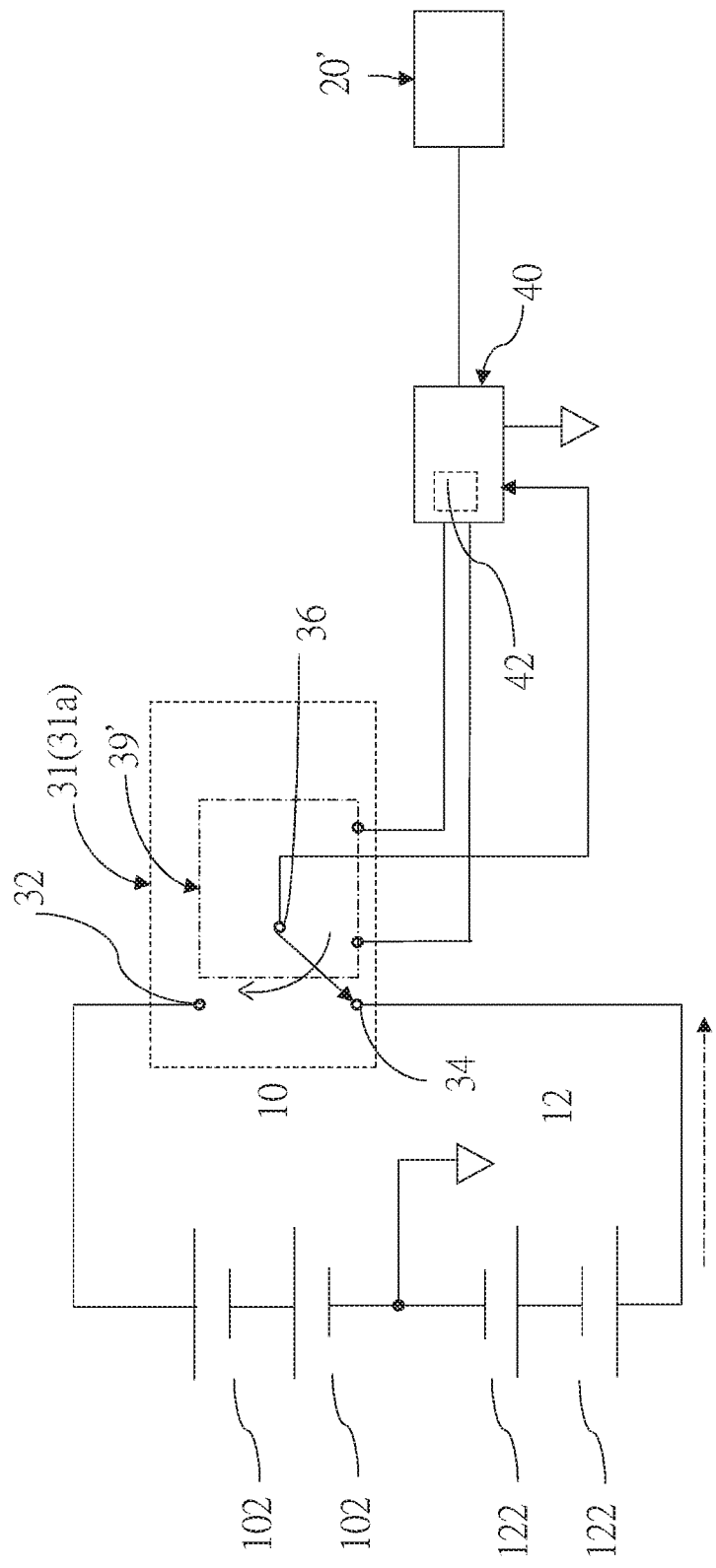
FIG. 7 is a schematic view showing a connection configuration of a load control system of a third embodiment according to the present invention.

As shown in FIG. 7, a load control system 300 of a third embodiment according to the present invention has almost the same system of the first embodiment mentioned above, except that a relay 31a of a power switching device 31 does not include a control port, and a switching unit 39' is only adapted to control the conduction state or the cut-off state between the power output port 36 and the first power input port 32 or the second power input port 34, and the control device 40 controls a load 20' directly through direct connection with the load 20', rather than through the relay 31a of the power switching device 31.

Figure 8:
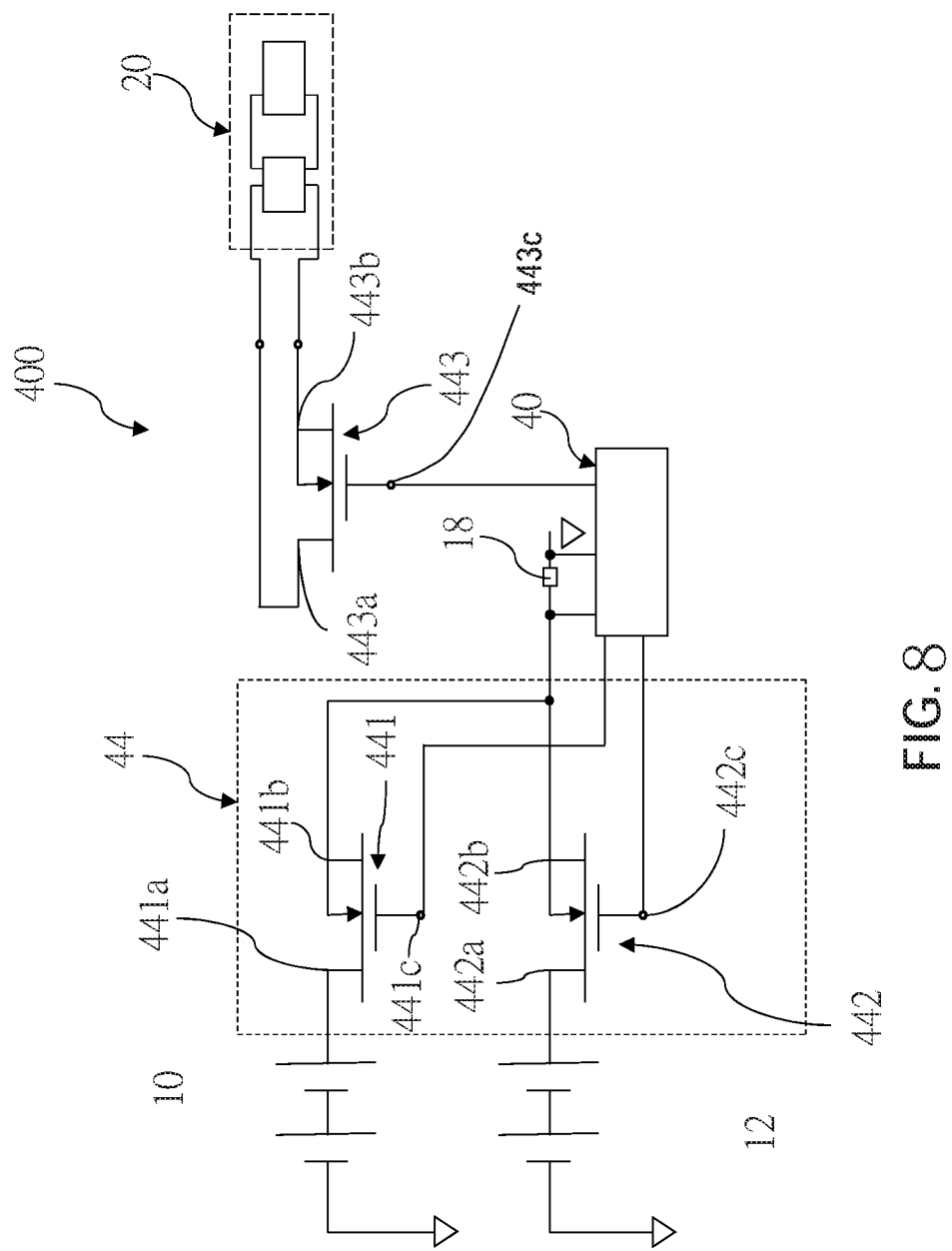
FIG. 8 is a schematic view showing a connection configuration of a load control system of a fourth embodiment according to the present invention.

As shown in FIG. 8, a load control system 400 of a fourth embodiment according to the present invention is illustrated. In this embodiment, a power switching device 44 includes a first transistor 441 and a second transistor 442, each of which includes a first terminal 441a, 442a, a second terminal 441b, 442b and a third terminal 441c, 442c, wherein the first terminals 441a, 442a of the first transistor 441 and the second transistor 442 form a first power input port and a second power input port respectively and the first power input port and the second power input port are electrically connected to the positive electrodes of the first battery pack 10 and the second battery pack 12; the second terminal 441b of the first transistor 441 and the second terminal 442b of the second transistor 442 are electrically connected to each other and form a power output port which is electrically connected to the positive terminal of the power input port 41 of the control device 40. The third terminals 441c, 442c of the first transistor 441 and the second transistor 442 are controlled by the control device 40 respectively to enable the first terminals 441a, 442a and the second terminals 441b, 442b of the first transistor 441 and the second transistor 442 to be in conduction or cut-off with each other. The first transistor 441 and the second transistor 442 are in the conduction state or the cut-off state to switch the power source of the control device 40, wherein the second terminals 441b, 442b of the first transistor 441 and the second transistor 442 are electrically connected to the positive electrode of the power storage unit 18. In addition, the load 20 controls a third terminal 443c of a third transistor 443 via the control device 40 to enable a first terminal 443a and a second terminal 443b of the third transistor 443 to be in conduction or cut-off with each other so as to control the load 20 to be in the second state or in the first state. Whereby, the control device 40 could be utilized to control the load 20 and the power switching device 44. In practice, the control device 40 could be utilized to control the load 20 directly as described in the second embodiment.

In the aforementioned embodiments, the load could be a variety of appliances, e.g., a lamp, a fan or a street lamp. The control method of the first embodiment could be applied to the load control system of the second, third and fourth embodiment as well.

According to the illustration mentioned above, the control device 40 of the load control system 100 according to the present invention could utilize the power of the first battery pack 10 and the second battery pack 12 respectively, thereby extending the respective usage time of the first battery pack 10 and the second battery pack 12, and reducing the replacement frequency of the batteries as well.

It must be pointed out that the embodiments described above are only some embodiments of the present invention. All equivalent structures which employ the concepts disclosed in this specification and the appended claims should fall within the scope of the present invention.

What is claimed is:

1. A load control system, adapted to be connected to at least one first battery and at least one second battery and to control a load to switch between a first state and a second state, comprising:

a power switching device, including a first power input port, a second power input port and a power output port, wherein the first power input port is electrically connected to at least one first battery and the second power input port is electrically connected to at least one second battery; the power switching device operates in one of a first switching mode and a second switching mode, and is controllable to operate in another one of the first switching mode and the second switching mode, wherein the first power input port and the power output port are in conduction with each other in the first switching mode, and the second power input port and the power output port are in conduction with each other in the second switching mode, wherein the power supplied from the power output port is not supplied to the load; and a control device, electrically connected to the power output port to receive the power supplied from the power output port to operate; when the control device operates to receive a control signal, the control device would control the load to switch from one of the first state and the second state to the other one according to the received control signal, and control the power switching device to switch from one of the first switching mode and the second switching mode to the other one;

wherein the power switching device further includes a relay which includes the first power input port, the second power input port, and the power output port; and wherein the load further includes two connecting wires; the load would be in the first state when the two connecting wires are open-circuited, and in the second state when the two connecting wires are short-circuited; the relay further includes a control port which includes two contacts electrically connected to the two connecting wires respectively; in the first switching mode, the two contacts are either short-circuited or open-circuited, and in the second switching mode, the two contacts are another one of being open-circuited or short-circuited.

2. The load control system of claim 1, wherein the control device further includes a power detection module to detect the power supplied from the power output port.

3. The load control system of claim 1, further comprising a power storage unit which is electrically connected to the power output port.

4. A control method for the load control system of claim 1, comprising steps of:

A. making the power switching device operate in the first switching mode to supply power from at least one first battery to the control device, thereby enabling the control device to operate; and B. transmitting the control signal to the control device to control the load to switch from the first state to the second state with the control device according to the received control signal, and controlling the power switching device to operate in the second switching mode with the control device to supply power from at least one second battery to the control device.

5. The control method for the load control system of claim 4, wherein the method further comprises a step after step B:

transmitting the control signal to the control device to control the load to switch from the second state to the first state with the control device according to the received control signal, and controlling the power switching device to operate in the first switching mode with the control device to supply power from at least one first battery to the control device.

* * * * *